United States Patent [19]

Smith

[11] 3,775,666
[45] Nov. 27, 1973

[54] VOLTAGE REGULATOR FOR SYNCHRONOUS GENERATORS

[75] Inventor: Forest D. Smith, St. Louis Park, Minn.

[73] Assignee: Electric Machinery Mfg. Company, Minneapolis, Minn.

[22] Filed: Apr. 24, 1972

[21] Appl. No.: 246,948

[52] U.S. Cl. .................. 322/28, 322/19, 322/36, 322/73
[51] Int. Cl. ............................................ H02p 9/30
[58] Field of Search ................. 322/19, 24, 25, 27, 322/28, 36, 73, DIG. 2, 33

[56] References Cited
UNITED STATES PATENTS

| | | | |
|---|---|---|---|
| 3,538,421 | 11/1970 | Young | 322/33 X |
| 3,522,482 | 8/1970 | Thompson | 322/33 X |
| 3,496,447 | 2/1970 | Thompson | 322/28 X |
| 3,539,907 | 11/1970 | Linstedt | 322/28 |
| 3,534,228 | 10/1970 | Hyvarinen et al. | 322/DIG. 2 |
| 3,378,754 | 4/1968 | Rosenberry, Jr. | 322/28 |
| 3,443,200 | 5/1969 | Kuhn | 322/28 X |
| 3,521,148 | 7/1970 | Kirk et al. | 322/28 |
| 3,210,603 | 10/1965 | Calfee et al. | 322/DIG. 2 |

Primary Examiner—James D. Trammell
Attorney—Ralph F. Merchant et al.

[57] ABSTRACT

An accurate, stable, and inexpensive voltage regulator for single or multiple phase synchronous generators. A monolithic integrated circuit comprising reference and error amplifiers establishes a stable output reference voltage. A comparator amplifier compares the reference voltage with a sensed output voltage of the generator and provides an excitation signal to a charging circuit in response thereto. Upon reaching a predetermined charging level, the charging circuit discharges through a unijunction transistor triggering circuit and enables the input gates of a pair of silicon controlled rectifiers configured in opposite legs of an AC bridge circuit. When enabled, each silicon controlled rectifier will conduct during that half cycle of the bridge AC excitation signal in which it is forward biased and will thereby energize the field or the exciter windings of the generator. A voltage or current feedback network from the generator or exciter field winding to the integrated reference circuit stabilizes the reference circuit against hunting.

3 Claims, 2 Drawing Figures

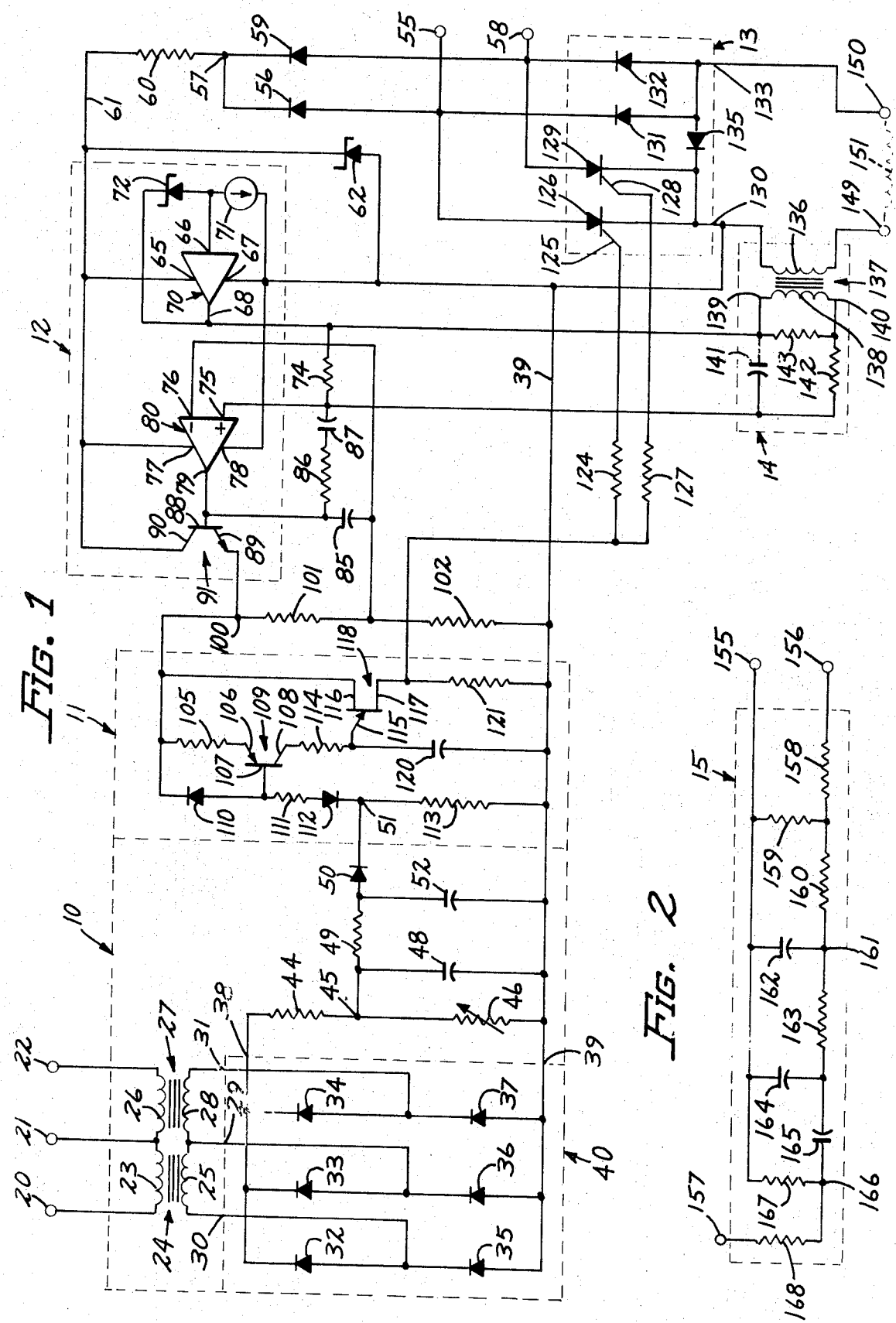

VOLTAGE REGULATOR FOR SYNCHRONOUS GENERATORS

BACKGROUND OF THE INVENTION

Accurate, temperature compensated voltage regulation is a universal requirement in the design of functional generator systems. Whether the generator voltage regulation is performed by direct excitation of the generator field windings or is performed indirectly by means of an exciter, and regardless of whether the system is single or multiple phase, the essential requirements for the voltage regulator remain unchanged. The voltage regulator must have the capability of rapidly compensating for any generator voltage fluctuations, must be stable over wide temperature variations, must be internally stabilized to prevent against hunting, must be reliable, should be physically and functionally adaptable to a wide variety of generator ratings and sizes, and relatively inexpensive.

The basic constituent parts of a voltage regulator as used with synchronous generator excitation systems are: a reference circuit, a voltage sensing circuit, a comparator/amplifier circuit for comparing the sensed and reference voltages, a feedback circuit for stabilizing the system against hunting, a power circuit, and a driving circuit for energizing the generator or exciter field winding. Prior art voltage regulators have recognized the advantages to be gained by the use of semiconductor components for performing the regulation functions. Accordingly, silicon controlled rectifiers are typically employed to drive the generator or exciter field winding, a unijunction transistor triggering circuit is typically used to gate the silicon controlled rectifiers, and a zener diode is used to establish a reference voltage. Although numerous configurations have appeared for the silicon controlled rectifier firing circuit, the triggering circuit, and the sensing circuit, little has been done to alter the basic passive zener diode method of establishing a reference voltage. Further, although the apparent cost, size, and functional accuracy advantages to be gained by the use of integrated circuits within the voltage regulator have been alluring, no practical means has been found in the prior art for effectively utilizing such devices within the voltage regulator. Attempts to perform the voltage sensing functions of the regulator by means of an integrated circuit have provided neither effective functional nor cost advantages to warrant their use in the voltage regulator.

Since the established reference signal is the basis upon which all other voltage regulator operations depend, the importance of precise control over this parameter is readily apparent. The present invention replaces the conventional zener diode reference signal source with active voltage reference and error amplifier circuits packaged principally within a single monolithic integrator circuit. By actively establishing, at reduced power levels, the reference signal with a reference amplifier and by thereafter compensating for any system fluctuations with the error amplifier, a definite, stable, temperature compensated, and system responsive reference signal not heretofore obtainable with prior art zener diode techniques is attained. Over-all voltage regulator accuracy is thereby increased while the over-all cost and size of the voltage regulator are decreased. In addition, stabilization inputs to the error amplifier provide an extremely flexible means for configuring the regulator's voltage or current stability feedback networks for ease of adaption to the particular ratings of a wide range of generator systems.

While the present invention will be described in conjunction with its use in a multiple phase synchronous system, it will be understood that the invention is not limited to this use, but can be used with any generating system requiring voltage regulation. Further, while the present invention, as described, uses a particular amplifier integrated circuit configuration to establish a reference voltage signal, it will be understood that the invention is not limited to the use of this particular integrated circuit, but that any equivalent amplifier and integrated circuit configuration for establishing a stable, compensated reference signal may be used without departing from the spirit or intent of this invention.

SUMMARY OF THE INVENTION

In the present invention, a single monolithic integrated circuit with its associated frequency compensating and feedback elements establishes a definite, temperature invariant reference output voltage. The integrated circuit consists primarily of a temperature compensated voltage reference amplifier, an error amplifier and a power series pass transistor. The temperature compensated voltage reference amplifier provides the error amplifier with a primary voltage reference signal. A stability feedback circuit connected to the voltage regulator output terminals provides a current or voltage stabilizing feedback signal to the error amplifier and thereby stabilizes the network against hunting. The error amplifier output is passed through a series pass transistor to a comparator amplifier and is fed back to a compensating input of the error amplifier to generate a frequency and temperature stabilized reference output voltage.

The comparator amplifier receives a rectified voltage signal from a voltage sensing circuit connected to measure the output voltage of the generator. When the generator output voltage drops below a predetermined level with respect to the reference voltage, the comparator amplifier energizes a charging circuit of a unijunction transistor triggering network. Upon attaining a predetermined charge, the charging circuit discharges through the unijunction transistor and enables the gates of a pair of silicon controlled rectifier (SCR) firing circuits.

The SCR's are configured in parallel opposing legs of an AC bridge network having output terminals connected across the generator or exciter field windings. When conducting, each SCR will independently cause current to flow through the exciter or generator field winding. Each SCR will conduct during that half of the AC cycle in which a positive voltage is applied to its anode, but only after its gate has also been enabled. In consequence, the field winding will be energized only during that portion of each half AC cycle after which the appropriate SCR has been enabled by the comparator amplifier and triggering circuits. Since the exciter or field winding energization establishes the generator output voltage, voltage regulation is thereby accomplished.

The SCR bridge and the integrated reference circuit and associated stability feedback circuits are powered by an AC source that is electrically isolated from the voltage sensing source. The isolation ensures a minimum of cross-talk and thereby allows the voltage reference circuitry to establish a true reference signal.

It is one object of the present invention, therefore, to provide an improved voltage regulator for electric generators.

It is another object of the present invention to provide an improved voltage regulator for electric generators having improved accuracy and temperature stability as a result of the use of temperature and frequency compensated amplifier circuits for establishing a reference signal internal to the voltage regulator.

It is a further object of the present invention to provide an improved voltage regulator for electric generators wherein the internal compensated voltage reference signal is produced substantially by a monolithic integrated circuit.

These and other objects of my invention will become apparent to those skilled in the art upon consideration of the accompanying specification, claims and drawings.

BRIEF DESCRIPTION OF THE DRAWINGS

FIG. 1 is a schematic representation of the voltage regulator of the present invention employing a current stabilization feedback network.

FIG. 2 is a schematic representation of a voltage stabilization feedback network that may alternatively replace the current stabilization feedback network in the voltage regulator disclosed in FIG. 1.

DESCRIPTION OF THE PREFERRED EMBODIMENT

Referring to FIG. 1 there is shown a voltage sensing circuit 10, a comparator/amplifier triggering circuit 11, a voltage reference circuit 12, an AC SCR bridge network 13, and a current stabilizing feedback network 14. These elements comprise the basic portions of a voltage regulator for generating systems. A trio of input terminals 20, 21 and 22 are connected to the output terminals (not shown) of a three-phase generator and also form the terminals of a first primary winding 23 of a first input transformer 24 and a second primary winding 26 of a second input transformer 27. First and second input transformers 24 and 27 each has respectively a secondary winding 25 and 28 serially connected. Serially connected, secondary windings 25 and 28 have a common terminal 29 and respective individual output terminals 30 and 31. The secondary winding terminals 29, 30 and 31 comprise the inputs of a three-phase full wave rectifier diode bridge 40, comprised of a plurality of diodes 32, 33, . . . , 37 connected in a standard three-phase full wave rectifier configuration, with a positive conductor 38 and a common conductor 39. It should be understood that although the preferred embodiment is being described in conjunction with a three-phase input, the invention applies equally well to a single phase system, in which case one of the transformers 24 or 27 would be removed Positive output terminal 38 of the three-phase full wave bridge 40 is serially connected by means of a limiting resistor 44, a junction 45 and a variable resistor 46 in parallel with filtering capacitor 48 to the common conductor 39. The junction 45 is also connected by means of a resistor 49 in series with a temperature compensating diode 50 to a comparison junction 51. The junction between resistor 49 and diode 50 is connected by means of a filtering capacitor 52 to the common conductor 39. Resistors 46 and 49 and capacitors 48 and 52 comprise the components of an RC filtering network. It will be understood, however, that these components may be replaced by those of an LC filtering network without departing from the spirit or intent of this invention.

A first AC input terminal 55 is connected by means of a rectifying diode 56 and a limiting resistor 60 to a positive bias conductor 61. A second AC input terminal 58 is connected by means of a rectifying diode 59 to a junction 57 between diode 56 and resistor 60. The first and second AC input terminals 55 and 58 are connected (not shown) to receive AC power from the generator being controlled by the voltage regulator. A biasing zener diode 62 is connected between the bias conductor 61 and the common conductor 39. The bias conductor 61 is directly connected to a positive bias input 65 of a reference voltage amplifier 70.

Reference voltage amplifier 70 further has an input 66, a negative bias input 67 and a reference output 68. Input 66 is connected by means of a current source circuit 71 to the negative bias input 67. Negative bias input 67 is directly connected to the common conductor 39. Output 68 of amplifier 70 is connected by means of a zener diode 72 to its input 66, and by means of a resistor 74 to a non-inverting input 75 of an error amplifier 80.

Error amplifier 80 further has an inverting input 76, a positive bias input 77, a negative bias input 78 and an output 79. The positive bias input 77 of the error amplifier 80 is directly connected to the positive bias conductor 61, and the negative bias input 78 is directly connected to the common conductor 39. Output 79 of amplifier 80 is connected by means of a frequency compensating capacitor 85 to its input 76, and is further connected by means of a resistor 86 in series with a capacitor 87 to the noninverting input 75 of amplifier 80.

The output 79 of error amplifier 80 is further connected to a base 88 of an NPN series pass transistor 91. NPN transistor 91 further has an emitter 89 and a collector 90. Collector 90 of transistor 91 is directly connected to the conductor 61, and emitter 89 is directly connected to a reference junction 100.

The reference voltage amplifier 70, the zener diode 72, the current source circuit 71, the error amplifier 80 and the series pass transistor 91 are formed in a single monolithic integrated voltage reference circuit 12. In the preferred embodiment, a Fairchild μA 723C monolithic voltage regulator integrated circuit is used. It should be understood, however, that any other integrated circuit which offers equivalent performance and design flexibility may be used.

The reference junction 100 is connected by means of a resistor 101 in series with a resistor 102 to the common conductor 39. A junction between resistors 101 and 102 is connected to the inverting input 76 of amplifier 80.

The reference junction 100 is also connected by means of a biasing resistor 105 to the emitter 106 of a PNP comparator amplifier transistor 109. Transistor 109 further has a base 107 and a collector 108. Base 107 is connected by means of a protection diode 110 to the reference junction 100, and is further connected by means of a resistor 111 in series with a blocking diode 112 to the comparison junction 51. The comparison junction 51 is further connected by means of a resistor 113 to the common terminal 39.

The collector 108 of transistor 109 is connected by means of a resistor 114 to an emitter 115 of a unijunction triggering transistor 118. Unijunction transistor 118 further has a first base 116 directly connected to the reference junction 100, and a second base 117 connected by means of a resistor 121 to common conductor 39. The emitter 115 of the unijunction transistor 118 is connected by means of a charging capacitor 120 to the common conductor 39.

The second base 117 of the unijunction triggering transistor 118 is also connected by means of a limiting resistor 124 to a gate 125 of a first silicon controlled rectifier 126, and by means of a limiting resistor 127 to a gate 128 of a second silicon controlled rectifier 129. First and second SCR's 126 and 129 are configured in opposing legs of the AC SCR bridge 13, and are the respective means by which the first and second AC input terminal 55 and 58 are connected to a first bridge output 130. The AC SCR bridge 13 is completed by a first rectifying diode 131 and a second rectifying diode 132 connected respectively to provide a return current flow path from a second bridge output 133 to the first and second AC input terminals 55 and 58. A commutating diode 135 is connected between the second and first bridge output 133 and 130 respectively. The first bridge output 130 is directly connected to the common conductor 39.

In the circuit embodiment illustrated in FIG. 1, a current stabilizing feedback network 14 is employed. The first bridge output 130 is connected by means of a primary winding 136 of a current stabilization sensing transformer 137 to a first voltage regulator output 149. The second bridge output 133 is directly connected to a second voltage regulator output 150. An exciter or a generator field winding 151 is connected across the first and second voltage regulator output terminals 149 and 150 respectively.

The current stabilization sensing transformer 137 further has a secondary winding 138 having a first terminal 139 and a second terminal 140. The first terminal 139 is directly connected to the reference output 68 of the reference voltage amplifier 70 and is also connected by means of a capacitor 141 to the noninverting input 75 of the error amplifier 80. The second terminal 140 of the secondary winding 139 is connected by means of a resistor 142 to the noninverting input 75 of the error amplifier 80. A resistor 143 is connected in parallel with the secondary winding 138 between the first and second terminals 139 and 140 respectively.

The current stabilizing feedback network 14 may be replaced by a voltage stabilizing feedback network 15, illustrated in FIG. 2. When the voltage stabilizing feedback network 15 is employed in the voltage regulator schematic diagram of FIG. 1, the first bridge output 130 of the AC SCR bridge 13 is connected directly to the first voltage regulator output 149, and the second bridge output 133 is connected directly to the second voltage regulator output 150. The voltage stabilizing feedback network has a first input 155, a second input 156 and an output 157. The first input 155 is directly connected to the first voltage regulator output 149 and the second input 156 is directly connected to the second voltage regulator output 150. The output 157 is connected to the noninverting input 75 of the error amplifier 80.

The voltage stabilizing feedback network 15 is configured as follows. The second input 156 is serially connected by means of a resistor 158 and a resistor 159 to the first input 155. The second input 156 is further serially connected by means of the resistor 158 and a resistor 160 to a first junction 161. A capacitor 162 is connected between the junction 161 and the first input 155. The junction 161 is serially connected by means of a resistor 163 and a capacitor 164 to the first input 155, and is further serially connected by means of the resistor 163 and a capacitor 165 to a second junction 166. The second junction 166 is connected by means of a resistor 167 to the first input 155 and by means of a resistor 168 to the output 157.

The design and use flexibility offered by the present invention will be readily appreciated from the foregoing description. The voltage regulator is applicable to either single or multiple phase generators. Both direct regulation by means of the generator field winding and indirect regulation by means of the exciter winding are available. Either RC or LC input sensing filtering can be used, and either current or voltage feedback stabilization can be employed. Finally, flexibility in the selection of appropriate integrated reference amplifier circuits allows state of the art semiconductor improvements to be directly incorporated into this invention.

OPERATION OF THE PREFERRED EMBODIMENT

In general, the voltage regulator regulates the generator output voltage by precisely controlling current flow through the field winding 151. It should be understood, that in regulating the voltage of large generators utilizing an exciter, the generator field winding 151 will be replaced by an exciter field winding. Current flow through the field winding 151 is directly controlled by the AC SCR bridge 13. It will readily be recognized that if the SCR's 126 and 129 of the AC bridge 13 were replaced by ordinary diodes, the field winding 151 would be continuously energized by the AC source through the first and second AC input terminals 55 and 58 respectively. However, as illustrated in FIG. 1, the SCR's 126 and 129, as positioned in symmetrically opposing legs of the AC bridge, block current flow to the field winding 151 for that half of an AC cycle during which they are reverse biased, and continue to block current flow during the succeeding half of the AC cycle in which they become forward biased until they receive an enabling signal through their respective gates 125 and 129. Therefore, by precisely controlling the gating signal to the SCR's, current flow to the field winding 151 and, thereby also the generator output voltage is accurately regulated.

When employed to regulate the output voltage of a three-phase generator, the voltage regulator input terminals 20, 21 and 22 are connected to either the delta or wye connected output terminals of the generator. The three-phase generator signals pass through the inputs 20, 21 and 22 and excite the primary windings 23 and 26 of the first and second input transformers 24 and 27 respectively. The primary excitation signals are sensed by the secondary windings 25 and 28 of the first and second input transformers 24 and 27 respectively which apply the sensed input signals through the transformer output terminals 29, 30 and 31 to the inputs of the three-phase wave rectifier 40. The sensed input signals are rectified by the diodes 32, 33, . . . , 37, and a rectified sensed signal appears at the positive output terminal 38 of rectifier 40. It should be noted, that for sensing the output voltage of a single phase system, one of the sensing input transformers 24 or 27 would be removed from the input sensing circuit 10. Similarly, one of the three branches of the three-phase full wave rectifier 40 would not be used.

The rectified sensed signal appearing at the positive output terminal 38 passes through the limiting resistor 44 to the RC filtering network comprised of the resistors 46 and 49 and the capacitors 48 and 52. The sensed signal is shaped by the RC filtering network and flows through diode 50 and resistor 113 to the common conductor 39. The voltage drop established across resistor 113, therefore, establishes a sensed voltage level at the comparison junction 51. Diode 50 compensates for the sensed signal applied to the comparison junction 51 so as to track, over temperature variations, any signal applied to comparison junction 51 through the blocking diode 112. Resistor 46 can be varied to adjust the level of the sensed input signal. As previously mentioned, an LC filtering network can equally well replace the illustrated RC filtering network.

Positive AC voltage applied to the first and second AC input terminals 55 and 58 respectively causes current to flow through the rectifying diodes 56 and 59 and through the limiting resistor 60 to the positive bias conductor 61. The bias voltage level applied to conductor 61 is limited by the biasing zener diode 62. The reference voltage amplifier 70, the error amplifier 80, and the series pass transistor 91 are respectively biased through the positive bias inputs 65 and 77, and through the collector 90.

The reference voltage amplifier 70, the zener diode 72 and the current source 71 combine to provide a temperature compensated primary reference voltage signal at the amplifier output 68. The primary reference voltage signal passes through resistor 74 to establish a reference voltage input signal to input 75 of the error amplifier 80. In response to the primary reference voltage signal the amplifier 80 produces a reference signal at its output 79 which is transmitted by means of the base-emitter junction of transistor 91 to the reference junction 100. The signal applied to junction 100 is fed back to the inverting input 76 of the amplifier 80 through resistor 101 of the resistor divider comprising resistors 101 and 102. Amplifier 80, therefore, compares the output reference voltage of the integrated circuit 12 with the primary reference voltage and adjusts the integrated circuit output voltage applied to reference junction 100 accordingly until the error is essentially zero. Feedback stability elements consisting of capacitor 85, resistor 86 and capacitor 87, are connected between the error amplifier output 79 (which is a high impedance node) and its inputs 75 and 76 to ensure stability of the error amplifier 80 while still providing acceptable output level and transient responses.

A third basic input signal is applied to the noninverting input 75 of amplifier 80 by either the current or voltage stability feedback networks 14 and 15 respectively. Temporary instantaneous changes in the generator load cause hunting (damped oscillations about a new stability point) that would render the generator unusable. The stabilizing feedback networks monitor the excitation signal of the generator field winding 151 and provide a feedback signal to input 75 of amplifier 80, thereby stabilizing the voltage regulator output and the generator output voltage against such hunting.

The current stabilizing feedback network 14, when employed, monitors the current excitation of the field winding 151 by means of the sensing transformer 137, filters the signal by means of the resistors 142 and 143 and the capacitor 141, and applies a feedback stabilization signal to input 75 of amplifier 80. The voltage stabilizing feedback network 15 of FIG. 2, when employed, monitors the voltage excitation applied to the field winding 151, filters the signal by means of the resistors 160 and 163 and the capacitors 162 and 164, and transmits the stability compensating feedback signal through the phase detecting capacitor 165 and the limiting resistor 168 to input 75 of the amplifier 80.

The stable reference voltage applied to reference junction 100 establishes a bias voltage across the first and second bases 116 and 117 respectively of the unijunction triggering transistor 118 with respect to the "floating" common conductor 39. A definite potential difference is also established between junctions 100 and 51 across the resistor 105, the emitter-base junction of transistor 109, the resistor 111 and the diode 112. Since the voltage appearing at junction 100 has been established as a definite, stable reference voltage, the magnitude of the potential difference between junctions 100 and 51 is determined solely by the level of the sensed input voltage appearing at the comparison junction 51.

When the positive potential difference between junctions 100 and 51 respectively is insufficient to forward bias the emitter-base junction of transistor 109 and diode 112, transistor 109 will not conduct. This condition will occur when the generator output voltage sensed by the voltage sensing circuit 10 is sufficiently large so as to produce a sensed signal flowing through diode 50 and resistor 113 that is large enough to produce a back biasing signal at junction 51 with respect to junction 100. Therefore, current will not flow through resistor 114 to the charging capacitor 120. Since capacitor 120 will be in an uncharged state, the voltage applied to the emitter 115 of unijunction transistor 118 will be insufficient to cause the unijunction transistor 118 to conduct or to enable the gate inputs 125 and 128 respectively of the SCR's 126 and 129. As previously described, until enabled the SCR's 126 and 129 will block current flow to the field winding 151.

When the generator output voltage at inputs 20, 21 and 22 decreases to a level such that the sensed signal flowing through diode 50 and resistor 113 is insufficient to establish a back biasing condition between the junctions 51 and 100, the transistor 109 will begin to conduct. If the sensed generator voltage continues to decrease, the voltage level established at comparison junction 51 due to the sensed signal from the voltage sensing circuit 10 will accordingly continue to decrease, causing a proportionate increase in current flow through the base-emitter junction of transistor 109, resistor 111 and the diode 112 to junction 51. As transistor 109 conducts, current flow will be established through its collector 108 and the resistor 114 to the charging capacitor 120. This current will charge the capacitor 120, exponentially raising the voltage applied to the emitter 115 of the unijunction transistor 118 until it equals the unijunction transistor firing voltage level. At that instant, the unijunction transistor 118 will conduct, thereby discharging capacitor 120 through its emitter (115)-second base (117) junction. Conduction of the unijunction transistor will provide an enabling signal through resistors 124 and 127 to the input gates 125 and 128 respectively of the SCR's 126 and 129.

Although both of the SCR's 126 and 129 are simultaneously enabled by a signal from the unijunction transistor 118, only one will be forward biased through the first and second AC inputs 55 and 58 respectively during each one-half of the AC cycle. When that SCR which is forward biased receives the enabling signal, it will conduct (fire) during the remaining half of that AC cycle; the other SCR will remain nonconducting. If, for example, the AC input signal applied to the first AC input 55 is positive, SCR 126 will be forward biased and will fire when it receives an enabling signal through its gate 125. When SCR 126 fires, current flow will be established through the field winding 151, and a return path will be established to the second AC input 58 through the diode 132. SCR 126 will thereafter continue to conduct, regardless of the signal applied to its gate 125, until a zero or negative signal is applied to the first AC input 55. The commutating diode 135 will provide a path for continued current flow through the field winding 151 immediately after either of the SCR's is turned off. A similar sequence will occur with respect to SCR 129 when a positive AC voltage is applied to the second AC input 58.

When either of the SCR's 126 or 129 conducts, the voltage at its anode (the appropriate AC input 55 or 58) decreases, thereby removing the bias potential applied through either diode 56 or 59 and resistor 60 to the positive bias conductor 61. Therefore, the integrated reference circuit 12 and the comparator/amplifier triggering circuit 11 are de-energized during that part of the input AC cycle in which the field winding 151 is being energized. This effect also assures the resetting of the unijunction transistor 118 in preparation for its application of a new gating signal to the SCR's during the next half AC cycle in response to the aforementioned comparison sequence.

While I have disclosed a specific embodiment of my invention, it is to be understood that this is for the purpose of illustration only, and that my invention is to be limited solely by the scope of appended claims.

I claim:

1. An improved voltage regulator for synchronous generators comprising:
   a. sensing means operable to produce a DC sensed output signal proportional to an electrical signal applied to its input;
   b. means connecting the input of said sensing means to receive an output voltage signal of a generator;
   c. voltage reference means having a power input for producing a reference signal when an energizing signal is applied to its power input, wherein said voltage reference means includes temperature compensated amplifier means operative to maintain the amplitude of said reference signal constant over ambient temperature changes;
   d. comparator/triggering circuit means having first and second inputs connected to respectively receive said sensed output and said reference signals, and operable to compare the received sensed output and reference signals for providing an output triggering signal in response thereto;
   e. current control means having output terminal means adapted to be connected to a field winding of said generator, said current control means being connected to receive said triggering signal and operable to provide to said output terminal means a controlled current signal responsive to said received triggering signal;
   f. means connecting a field winding of said generator to said output terminal means and operable to receive said controlled current signal and to energize the field winding therewith; and
   g. synchronizer means operatively connecting the power input of said voltage reference means with said current control means, said sychronizer means being operable to apply an energizing signal to the power input of said voltage reference means in synchronism with the operation of said current control means.

2. An improved voltage regulator for synchronous generators according to claim 1, including stabilizing circuit means connected to said output terminal means and operable to monitor electrical signals thereat and to produce a stabilizing feedback output signal in response thereto; and wherein said voltage reference means comprises:
   a. temperature compensated amplifier means operable to produce a regulated voltage signal; and
   b. error amplifier means having a non-inverting input operatively connected to receive said regulated voltage and said stabilizing feedback output signals and having an inverting input operatively connected by a feedback circuit to an output of said error amplifier, wherein said error amplifier operatively produces said reference signal in response to the signals applied to its inverting and non-inverting inputs.

3. An improved voltage regulator for synchronous generators according to claim 2, wherein said temperature compensated amplifier means, said error amplifier means and said feedback means are substantially formed in a single monolithic integrated circuit.

* * * * *